United States Patent [19]
Kameyama et al.

[11] Patent Number: 5,100,271
[45] Date of Patent: Mar. 31, 1992

[54] TOOL DRIVING UNIT

[75] Inventors: Fumio Kameyama, Nagoya; Chikamasa Hattori, Ichinomiya, both of Japan

[73] Assignee: Brother Kogyo Kabushiki Kaisha, Aichi, Japan

[21] Appl. No.: 329,873

[22] Filed: Mar. 28, 1989

[30] Foreign Application Priority Data

Mar. 28, 1988 [JP] Japan .................................. 63-74018
Oct. 24, 1988 [JP] Japan ................................ 63-267814
Oct. 24, 1988 [JP] Japan ................................ 63-267815
Feb. 17, 1989 [JP] Japan ..................................... 1-38941

[51] Int. Cl.⁵ ......................... B23B 47/20; B23G 1/18
[52] U.S. Cl. ................................. 409/231; 408/129; 408/138; 408/239 R
[58] Field of Search .......... 408/137, 138, 10, 239 R, 408/239 A, 240, 124, 129; 409/231, 232, 233, 234

[56] References Cited

U.S. PATENT DOCUMENTS

| | | | |
|---|---|---|---|
| 3,623,823 | 11/1971 | Val | 408/137 X |
| 3,640,147 | 2/1972 | Fantoni | 408/137 X |
| 4,099,106 | 7/1978 | Nikaido | 318/115 |
| 4,691,787 | 9/1987 | Akesaka | 408/137 X |
| 4,934,040 | 6/1990 | Turchan | 29/566 |

FOREIGN PATENT DOCUMENTS

| | | |
|---|---|---|
| 2659066 | 7/1978 | Fed. Rep. of Germany ........ 408/10 |
| 49-36064 | 10/1974 | Japan . |
| 56-11039 | 1/1981 | Japan . |
| 61-191845 | 11/1986 | Japan . |
| 61-191846 | 11/1986 | Japan . |
| 62-5846 | 2/1987 | Japan . |
| 62-218041 | 9/1987 | Japan . |
| 1141217 | 1/1969 | United Kingdom . |
| 2086777 | 5/1982 | United Kingdom . |
| 2097191 | 10/1982 | United Kingdom . |
| 2097197 | 10/1982 | United Kingdom . |

Primary Examiner—Z. R. Bilinsky
Attorney, Agent, or Firm—Oliff & Berridge

[57] ABSTRACT

A tool driving unit for moving a tool in axial direction thereof and for rotating the tool about its axis. The tool driving unit comprises a spindle supported in the housing frame, a tool chuck mounted on the one end portion of the spindle for holding the tool, a first motor including a first hollow rotor and for rotating the spindle, a second motor including a second hollow rotor and for moving the spindle in the axial direction, means for transmitting a rotation of the first hollow rotor to the spindle, and means for converting a rotation of the second hollow rotor into axial movement of the spindle. The first rotor is rotated to rotate the spindle which corotatably engages the first rotor through the transmitting means. The second rotor is rotated, and the spindle is smoothly moved axially forwardly or rearwardly by the converting means which converts rotary motion of the second rotor to axial motion of the spindle.

20 Claims, 7 Drawing Sheets

TOOL DRIVING UNIT

BACKGROUND OF THE INVENTION

The present invention relates to a tool driving unit, and more particularly to a single-shaft tool driving unit for moving a tool such as a tap or a drill in axial direction while rotating the same.

Heretofore, tool driving units such as tapping units have at least two shafts, i.e., the shaft of a straight drive device coupled to a motor shaft for moving a tool back and forth and the shaft of a rotary drive device coupled to another motor shaft for rotating the tool. The back-and-forth movement and the rotary movement are transmitted from the two shafts to a spindle supporting the tool through gear trains.

There has been proposed a tool driving unit in which a single motor is disposed coaxially with a spindle having a ball screw shaft portion and a ball spline shaft portion, for selectively rotating and moving back and forth the spindle (see Japanese Laid-Open Patent Publication No. 61-38892).

According to the former tool driving unit, the devices for generating the back-and-forth movement and the rotary movement are composed of the two or more shafts that are not positioned coaxially. Therefore the tool driving unit has a large outside diameter, and requires a large installation space. The two shafts have to be positioned with increased accuracy when the tool driving unit is installed in place. Another problem is that the tool driving unit is made up of a large number of parts and hence complex in structure.

The latter tool driving unit is disadvantageous in that since the spindle can selectively be rotated and moved back and forth by the clutch mechanism, the tool cannot be moved back and forth while it is being rotated.

SUMMARY OF THE INVENTION

In view of the aforesaid drawbacks of the conventional tool driving unit, it is an object of the present invention to provide a tool driving unit which includes a single shaft for producing both rotary and back-and-forth movements, is compact in size for easy handling, requires only a small installation space.

Another object of the present invention to provide such tool driving unit which is made up of a reduced number of parts, can position the parts with increased accuracy, and is capable of producing smooth movements.

According to the present invention, there is provided tool driving unit for moving a tool in axial direction thereof and for rotating the tool about its axis; the tool driving unit comprising: a housing frame; a spindle supported in the housing frame and extending in the housing frame, the spindle having one end portion projecting out of the housing frame; a tool chuck mounted on the one end portion of the spindle for holding the tool; a first motor provided in the housing frame for rotating the spindle, and comprising a first hollow rotor disposed around the spindle, and a first stator fixed to the housing frame; a second motor provided apart from the first motor in the housing frame for moving the spindle in the axial direction, the second motor comprising a second hollow rotor disposed around the spindle and a second stator fixed to the housing frame; means for transmitting a rotation of the first hollow rotor to the spindle, the transmitting means being provided between the first hollow rotor and the spindle; means for converting a rotation of the second hollow rotor into axial movement of the spindle, the converting means being provided between the second hollow rotor and the spindle;

control mean for controlling the first and second motors according to the input command given by the operators.

When the first motor is rotated in a selected one of the opposite directions, the first rotor is rotated to rotate the spindle which corotatably engages the first rotor through the transmitting means. When the second motor is rotated in a selected one of the opposite directions, the second rotor is rotated, and the spindle is smoothly moved axially forwardly or rearwardly by the converting means which converts rotary motion of the second rotor to axial motion of the spindle.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. II is a fragmentary cross-sectional view showing threads on an inner peripheral surface of a hollow rotor and threads on an outer peripheral surface of a hollow quill in the tool driving unit shown in FIG. 10.

DETAILED DESCRIPTION OF THE PREFERRED EMBODIMENTS

Figure 1:
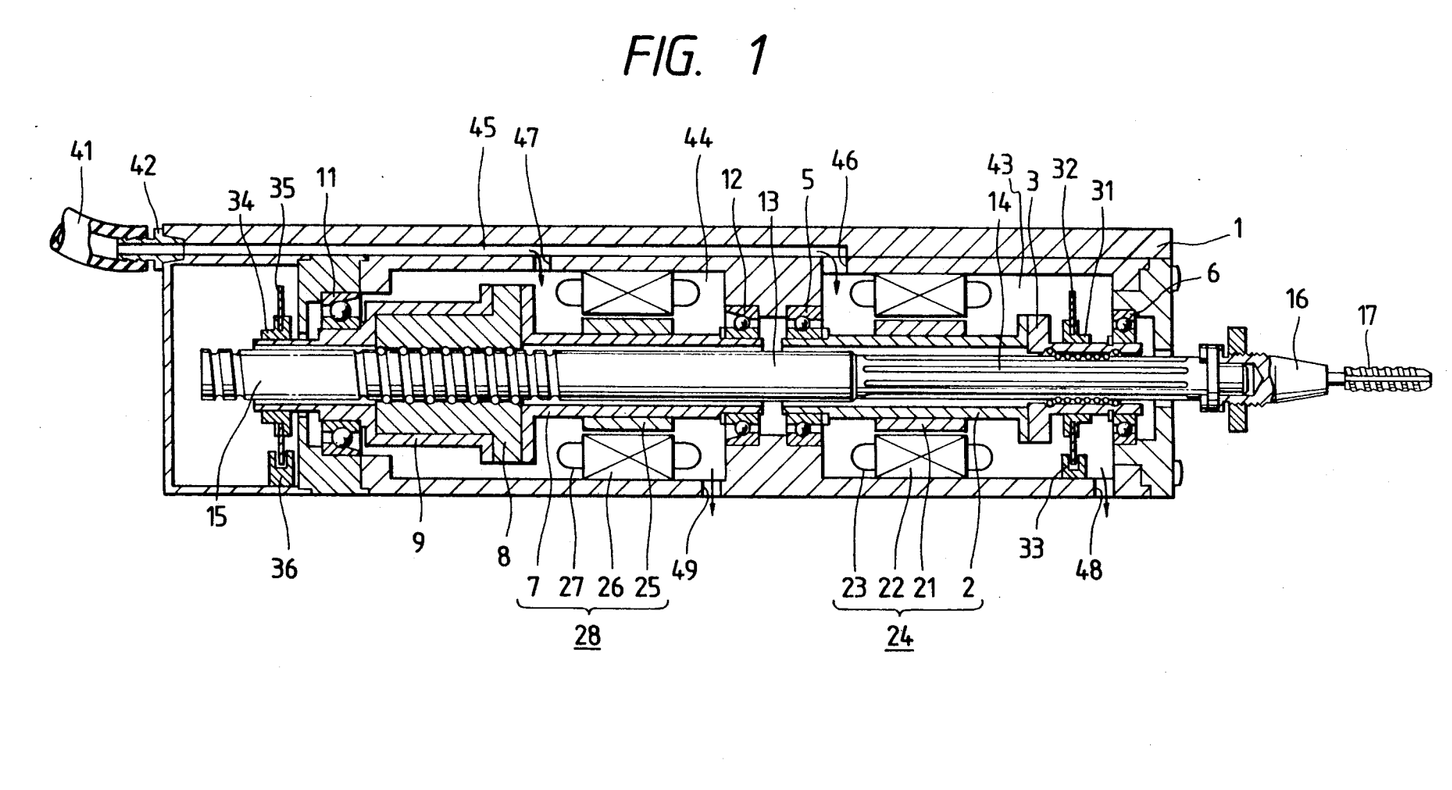
FIG. 1 is a cross-sectional view of a tool driving unit according to a first embodiment of the present invention.

FIG. 1 shows in cross section a tool driving unit according to a first embodiment of the present invention.

The tool driving unit includes a housing frame having a front portion (on the righthand side of FIG. I) in which a first rotor assembly comprising a first rotor 2 and a ball spline bearing 3 is rotatably supported by means of two roller bearings 5, 6. The hollow rotor 2 which is substantially cylindrical in shape and the ball spline bearing 3 have respective flanges fastened firmly to each other as the first rotor assembly.

The housing frame I also includes a rear portion (on the lefthand side of FIG. in which a second rotor assembly comprising a second hollow rotor 7, a ball feed nut 8, and a bracket 9 is rotatably supported by means of two ball bearings 11, 12. The second hollow rotor 7 which is substantially cylindrical in shape, the ball feed nut 8, and the bracket 9 which surrounds the ball feed nut 8 and extends rearwardly as a cylinder, have respective flanges fastened firmly to one another by bolts (not shown), thus providing the second rotor assembly.

A spindle 13 extends axially through the first and second rotor assemblies rotatably supported in the housing frame 1. The spindle 13 has ball splines 14 on its front portion and a ball screw 15 on its rear portion. The front ball splines 14 are axially slidably fitted in spline grooves defined in the ball spline bearing 3. The rear ball screw 15 is threaded in the ball feed nut 8. In this manner, the spindle 13 is supported on the central axes of the first and second rotor assemblies.

The spindle 13 has a tip end projecting forwardly from the housing frame 1, with a tapping tool 17 being mounted on the projecting tip end by means of a chuck 16.

An annular array of permanent magnets 21 is fixedly mounted on and around the first hollow rotor 2. A first stator 22 having an armature winding 23 is disposed in and secured to the housing frame in radially confronting relation to the permanent magnets 21 with a small gap therebetween. The first hollow rotor 2 to which the permanent magnets 21 are fixed and the first stator 22 jointly constitute a first motor 24. Likewise, an annular array of permanent magnets 25 is fixedly mounted on and around the second hollow rotor 7, and a second stator 26 having an armature winding 27 is fixed to the housing frame 1, the second hollow rotor 7 with the permanent magnets 25 and the second stator 26 jointly providing a second motor 28.

An encoder disc 32 is fixed to the outer periphery of the ball spline bearing 3 by a ring 31. The angular position of the encoder disc 32 is detected by a photosensor 33 fixed to an inner surface of the housing frame Similarly, an encoder disc 35 is fixed to a rear cylindrical end of the bracket 9 by a ring 34, and the angular position of the encoder disc 35 is detected by a photosensor 36 secured to an inner surface of the housing frame 1.

The housing frame 1 is of a fully closed structure and has an air inlet 42 on its rear end to which a tube 41 extending from a pressurized air source (not shown) can be connected. The housing frame 1 also has a communication passage 45 defined in its wall and communicating with the air inlet& and chambers 43, 44 defined in the housing frame 1 in which the first and second motors 24, 28 are disposed, respectively. The communication passage 45 has air inlet ports 46, 47 opening into the respective chambers 43, 44 and positioned axially rearwardly of the motor stators 22, 26, respectively. The housing frame 1 further has air outlet ports 48, 49 defined in its wall and positioned axially forwardly of the motor stators 22, 26, respectively, and opening into the respective chambers 46. 47.

The stator or armature windings 23, 27 and the photosensors 33, 36 are electrically connected to a control unit (not shown). The control unit has a control circuit responsive to signals from the photosensors 33. 36 for detecting the angular positions of the motors 24, 28 and controlling the rotation of these motors 24, 28 in synchronism with each other. The ratio of synchronous rotational speeds of the motors 24, 28 can be selected from an external control panel (not shown) for inputting command given by the operator.

Operation of the tool driving unit thus constructed will be described below.

When the first and second motors 24, 28 are synchronously rotated to enable the first and second hollow rotors 2, 7 to take the same angular position at all times, the spindle 13 is rotated by the ball spline bearing 3. Since the ball feed nut 8 rotates in unison with the spindle 13 at the same speed, no action is applied to the ball screw 15, and the spindle 13 makes rotary motion only.

When the first motor 24 is de-energized and only the second motor 28 is energized, the spindle 13 is prevented by the ball spline bearing 3 against rotation, but is axially movable. Rotation of the ball feed screw 8 causes the spindle 13 to move axially dependent on the lead of the ball screw 15.

When the first and second motors 24, 28 are rotated at different speeds, the spindle 13 is rotated by the ball spline bearing 3 at a speed equal to the speed of rotation of the first motor 24. The ball feed screw 8 is caused to rotate relatively at a speed which is the difference between the rotational speeds of the two motors 24, 28. The spindle 13 is axially moved dependent on the differential speed and the lead of the ball screw 15. Therefore, the spindle 13 makes composite motion by rotating about its own axis while axially moving. Accordingly, by appropriately controlling the rotational speeds and directions of the first and second motors 24, 28, the spindle 13 enables the tapping tool 17 to form screw threads in a workpiece (not shown). The spindle 13 may be controlled to make complex composite motion successively by suitably controlling the rotational speeds of the two motors 24, 28.

For example, the first motor 24 is rotated at a rotational speed $N_1$ and the second motor 28 is rotated at a rotational speed $(N_1 + N_2)$ in synchronism with the first motor 24 to enable the spindle 13 to make unidirectional screwing motion at a rotational speed $N_1$ with a pitch $N_2 \cdot L/N_1$ (where L represents the lead of the screw 15). By rotating the first motor 24 at a rotational speed $-N_1$ (where a minus sign $(-)$ represents reverse rotation) and the second motor 28 at a rotational speed $(-N_1 -N_2)$ in synchronism with each other, the spindle 13 makes returning motion at a rotational speed $N_1$ with a pitch $N_2 \cdot L/N_1$. The pitch $N_2 \cdot L/N_1$ of the screwing motion or the returning motion may be varied by changing the speed $N_2$ and the ratio of the rotational speeds of the motors 24, 28.

When the motors 24, 28 are energized, heat is generated by resistance of the windings 23, 27 of the stators 22, 26. The heat can be cooled and discharged by air supplied under pressure from the air inlet 42.

The air inlet 42 is supplied with air under pressure from which dust has been removed by a filter (not shown). The supplied air is then ejected from the air inlet ports 46, 47 into the chambers 43, 44 and passes through gaps in the stators 22, 26, and is then discharged from the housing frame 1 through the air outlet ports 48, 49. When the air passes through the gaps in the stators 22, 26, it removes the heat from the windings and cools them. Since such air is forcibly supplied, the motors 24, 28 are cooled regardless of their rotational speeds. The heat generated by the motors 24, 28 is prevented from being transmitted to the ball screw 15 of the spindle 13 and from reducing the accuracy of the ball screw 15 due to thermal expansion thereof.

According to the first embodiment, the spindle 13 is supported in the housing frame for rotation and axial motion only by the ball spline bearing 3 and the ball feed nut 8 which are coaxially supported in the housing frame 1. Therefore, the structure which supports the spindle that makes composite motion is simple, and the number of parts making up such supporting structure is reduced.

Inasmuch as the rotating components 2, 7, 13 and the like are all disposed on the single axis of rotation, the number of ball bearings 5, 6, 11, 12 is small, and the machining accuracy of the components on which these ball bearings 5, 6, 11, 12 are mounted can be increased with ease. Moreover, the overall size of the tool driving unit including the housing frame 1 may be made compact.

The motors 24, 28 are integrally combined with the respective hollow rotors 2, 7 of the rotor assemblies. The space in which these rotational drivers are installed is therefore small, and the number of parts used of the drivers is reduced.

In the above embodiment, the motors 24, 28 are constructed on the respective hollow rotors 2, 7. However, the hollow rotors 2, 7 may be dispensed with, and the permanent magnets 21, 25 may be fixed directly to the outer peripheries of the ball spline bearing 3 and the ball feed nut 8 to provide unitary motors.

While the ball splines 14 are disposed on the front portion of the spindle 13 and the ball screw 15 is disposed on the rear portion of the spindle 13, the ball splines 14 and the ball screw 15 may be disposed in a composite fashion over the entire length of &he spindle 13, thus reducing the entire length of the tool driving unit.

A tool driving unit according to a second embodiment of the present invention will be described below with reference to FIGS. 2 through 4.

Figure 2:
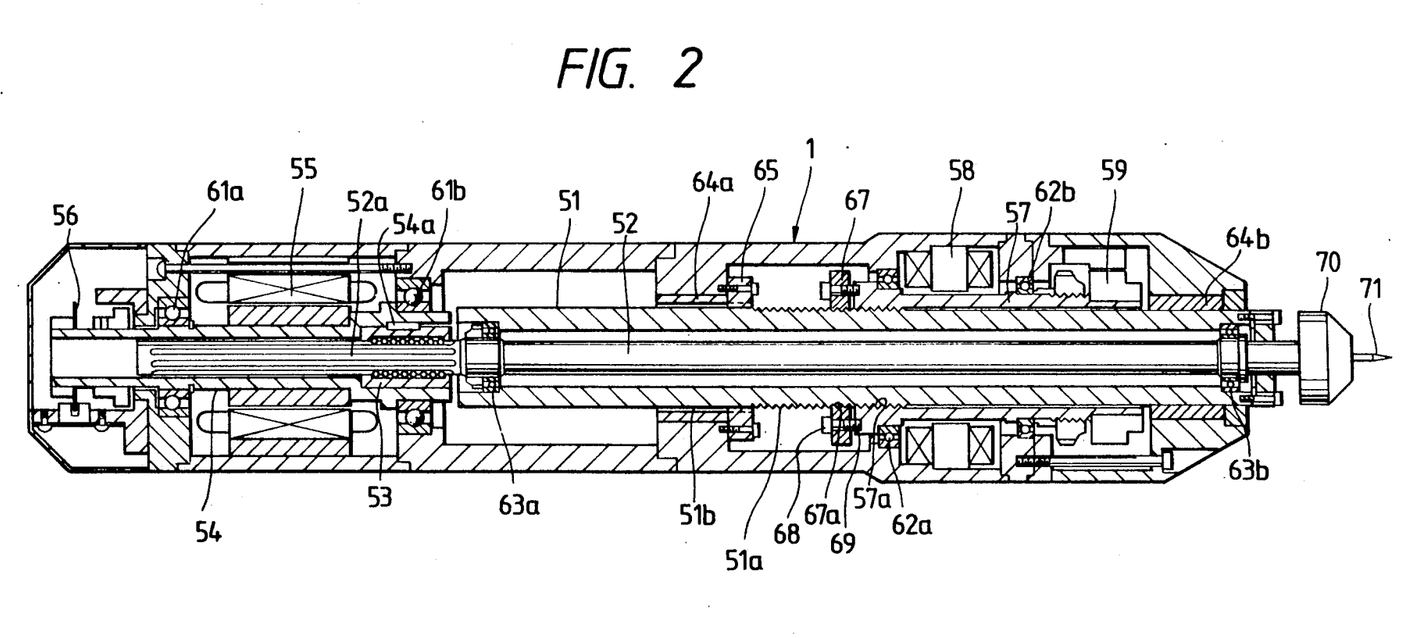
FIG. 2 is a cross-sectional view of a tool driving unit according to a second embodiment of the present invention.

As shown in FIG. 2 a hollow quill 51 axially slidably disposed centrally in a housing frame I by means of slide bearings 64a, 64b. The hollow quill 51 of a hollow construction has an engaging portion 51b engaging a stop member 65 fixed to the housing frame 1 for preventing the hollow quill 51 from rotating about its own axis. The hollow quill 51 is externally threaded at 51a on its outer peripheral surface. A spindle 52 is rotatably supported in the hollow quill 51 by means of roller bearings 63a, 63b. The spindle 52 has a tip end projecting out of the hollow quill 51 and the housing frame I, and a chuck 70 is mounted on the tip end of the spindle 52 for supporting a tool (a tapping tool 71 in the second embodiment). The spindle 52 has an opposite end projecting from the proximal end of the hollow quill 51. The projecting end of the spindle 52 has a plurality of axial splines 52a formed on the outer periphery thereof and serving as a driven member. A first hollow rotor 54 is rotatably supported around splines 52a on the proximal end of the spindle 52 in the housing frame by means of roller bearings 61a, 61b. A sleeve having ball splines 53 meshing with the splines 52a and slidable axially of the spindle 52 is corotatably mounted in the first hollow rotor 54 by means of a key 54a in a distal end of the first hollow rotor 54 near the hollow quill 51. A first motor 55 is disposed around the proximal end of the spindle 52 and mounted on the inner periphery of the housing frame 1. The first motor 55 is selectively reversible in the direction of rotation. An encoder 56 is disposed around the first hollow rotor 54 on its proximal end for detecting the angular position and rotational speed of the first hollow rotor 54. A second hollow rotor 57 is rotatably supported around the hollow quill 51 in the housing frame 1 by means of roller bearings 62a, 62b. The second hollow rotor 57 is internally threaded at 57a, and the internal threads 57a are held in mesh with the external threads 51a of the hollow quill 51. A second motor 58 is disposed around the hollow quill 51 and mounted on the inner peripheral surface of the housing frame 1, the motor 58 being selectively reversible in its direction of rotation. An encoder 59 is positioned around the second hollow rotor 57 on its tip end for detecting the angular position and rotational speed of the second hollow rotor 57.

Figure 3:
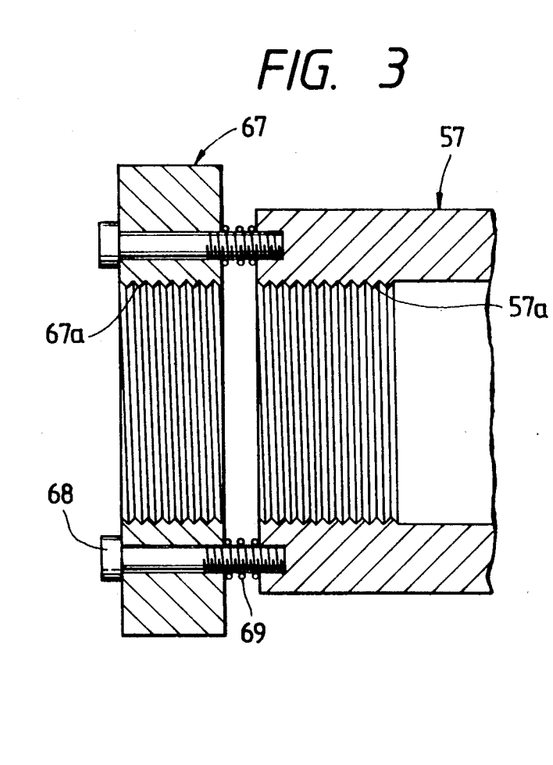
FIG. 3 is an enlarged fragmentary cross-sectional view of a backlash removing mechanism for a hollow rotor in the tool driving unit shown in FIG. 2.

An angular screw 67 which is internally threaded at 67a in mesh with the external threads 51a of the hollow quill 51 is axially movably disposed around the distal end of the second hollow rotor 57 by set screws 68, with compression springs 69 therebetween as shown in FIG. 3. The axial position of the screw 67 can be adjusted by the set screws 68 to hold the internal threads 57a of the second hollow rotor 57 against one wall surfaces of the external threads 51a of the hollow quill 51. The internal threads 67a of the annular screw 67 are pressed against the opposite wall surfaces of the external threads 51a under the bias of the springs 69. Therefore, any play between the external threads 51a of the hollow quill 51 and the internal threads 57a of the second hollow rotor 57 is eliminated to remove the axial backlash of the hollow quill 51. The compression springs 69 may be interposed between the heads of the set screws 68 and the screw 67. Alternatively, tension springs may be interposed between the screw 67 and the proximal end of the second hollow rotor 57.

The tool driving unit of the second embodiment operates as follows:

In FIG. 2, the first motor 55 is energized to rotate the first hollow rotor 54 in one direction or the other, thereby rotating the spindle 52 in the same direction through the ball splines 53. At this time, the rotational speed of the first hollow rotor 54 is detected by the encoder 56. Based on the detected rotational speed, the second motor 58 is energized in or out of synchronism with the first hollow rotor 54 to rotate the first second hollow rotor 57 in the same direction or the opposite direction. The rotative force of the second hollow rotor 57 is transmitted to the hollow quill 51 through the internal threads 57a of the rotor 57 and the external threads 51a of the hollow quill 51 in mesh therewith. Since the hollow quill 51 is prevented from rotating by the stop member 65, the rotative force transmitted to the hollow quill 51 is converted to an axial moving force to move the hollow quill 51 toward its distal end with respect to the housing frame 1. Therefore, while the spindle 52 is being rotated in one direction, it is axially moved toward its distal end. When the first motor 55 and the second motor 58 are controlled to rotate in synchronism with each other, the tapping tool 71 forms screw threads in a workpiece (not shown).

The principles behind the conversion from the rotative force transmitted to the hollow quill 51 to the axially moving force will be described below with reference to FIG. 4. FIG. 4 shows one of the external threads 51a of the hollow quill 51 in a developed fashion. Assuming that the lead angle of the thread is indicated by $\theta$, the thread pitch p, the effective radius of the thread r, the rotative force transmitted to the quill T, and the axially moving force F, these parameters are related to each other as follows:

$$F \times p = 2\pi r \times T/r = 2\pi T$$

Therefore, $$F = 2\pi T/p \quad (1)$$

$$p = 2\pi r \times \tan\theta \quad (2)$$

From the equations (1) and (2), $F = 2\pi T/(2\pi r \cdot \tan\theta) = (T/r)(1/\tan\theta)$. Therefore, the axially moving force F is proportional to the rotative force T and inversely proportional to r and $\tan\theta$.

In the second embodiment, the splines 52a and the ball splines 53 are employed to transmit the rotative force of the first hollow rotor 54 to the spindle 52. However, the spindle 52 may have an axial key slot defined therein and a key engaging &he key slot may be fixed to the inner peripheral surface of the first hollow rotor 54 for transmitting the rotative force from the first hollow rotor 54 to the spindle 52.

A tool driving unit according to a third embodiment will be described below with reference to FIGS. 5 through 9

Figure 4:
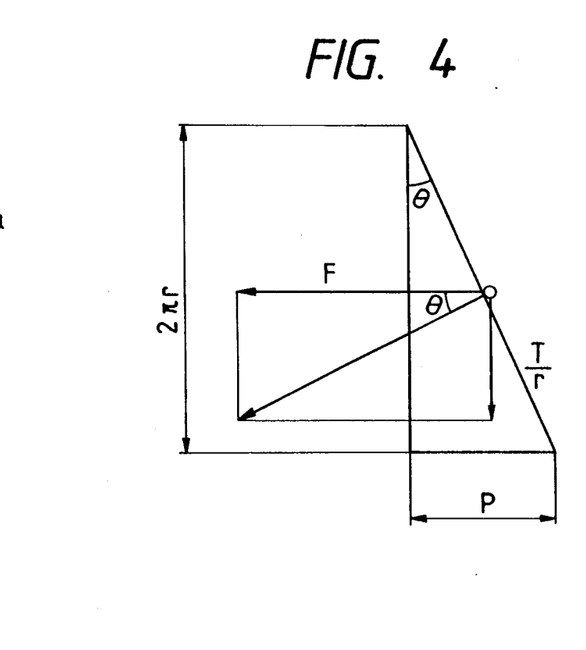
FIG. 4 is a schematic diagram showing, in a developed fashion, a male screw thread of a quill in the tool driving unit of FIG. 2.

Those parts shown in FIGS. 5 through 9 which are structurally and functionally identical to those shown in FIGS. 2 through 4 are denoted at identical reference numerals, and will not be described in detail.

Figure 5:
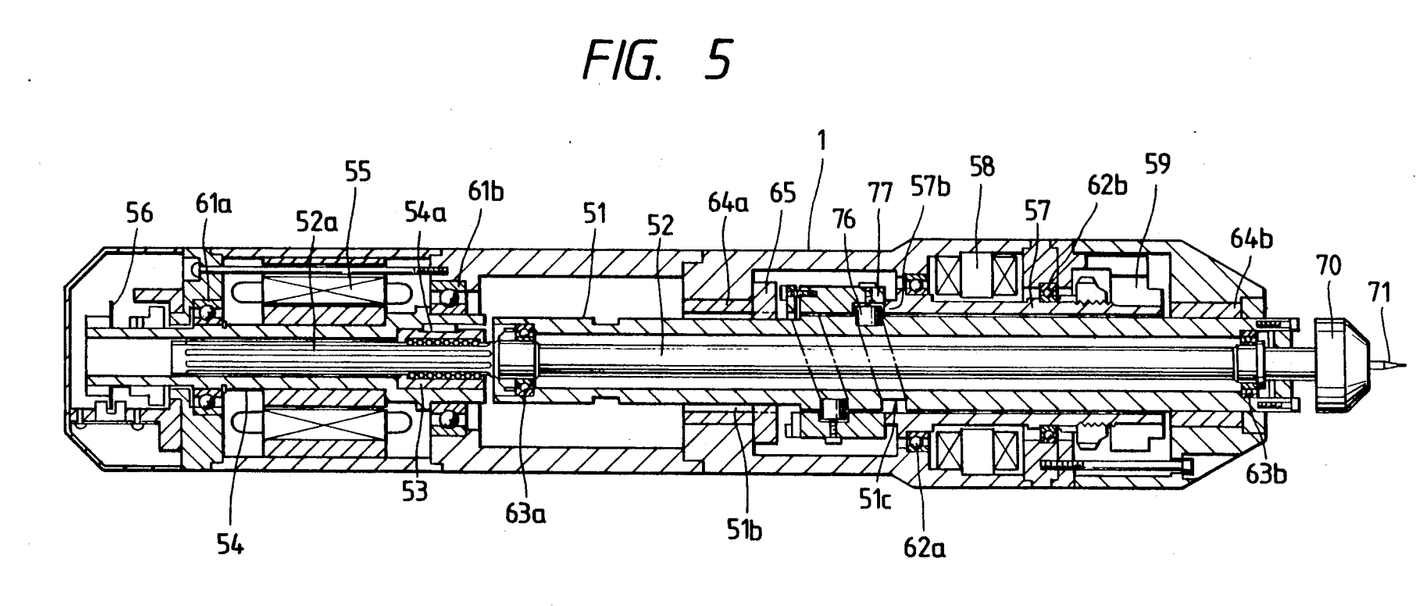
FIG. 5 is a cross-sectional view of a tool driving unit according to a third embodiment of the present invention.
Figure 6:
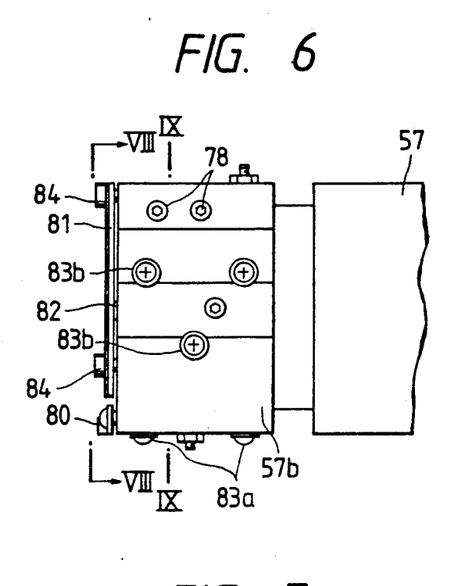
FIG. 6 is an enlarged fragmentary front elevational view of an end of a hollow rotor in the tool driving unit of FIG. 5.
Figure 7:
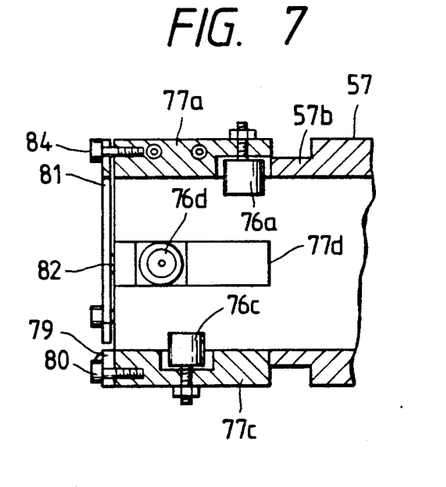
FIG. 7 is a cross-sectional view of the hollow rotor end shown in FIG. 6.
Figure 8:
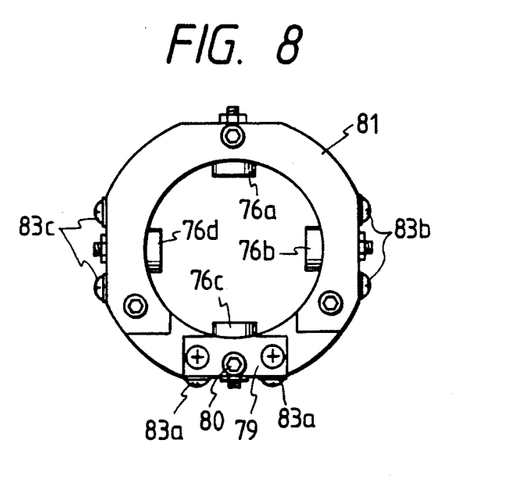
FIG. 8 is an end view taken along line VIII—VIII of FIG. 6.
Figure 9:
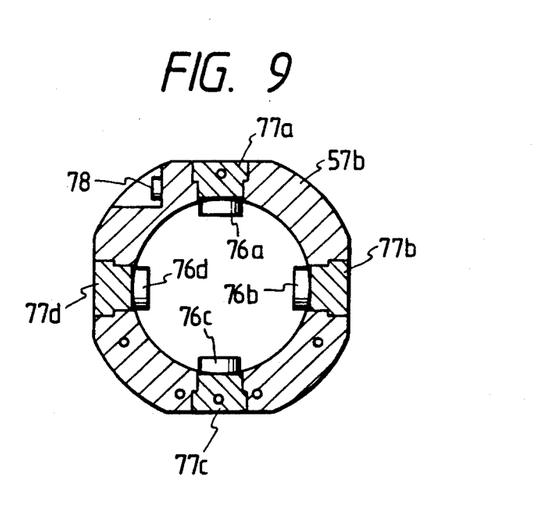
FIG. 9 is a cross-sectional view taken along line IX—IX of FIG. 6.

A helical cam groove 51c is defined in the outer peripheral surface of the hollow quill 51. A plurality of cylindrical cam followers 76 are rotatably mounted by respective cam follower holders 77 on the inner peripheral surface of the proximal end 57b of the second hollow rotor 57, the cam followers 76 being rotatable about their axes and loosely fitted in the cam groove.

As shown in FIGS. 6 through 9, the cam followers 76 includes four cam followers 76a through 76d which are rotatably mounted on respective independent cam follower holders 77a through 77d at axially displaced positions according to the lead of the helical cam groove 51c of the hollow hollow quill 51. The cam followers 76a through 76d are disposed on the inner peripheral surface of the proximal end 57b of the second hollow rotor 57 at circumferentially equally spaced intervals. The cam follower holder 77a is fixed to the second hollow rotor 57 by means of screws 78. The cam follower holder 77c which is diametrically opposite to the cam follower holder 77a is prevented from radially moving by screws 83a, and is fixed to a holder adjustment plate 79 axially adjustably attached to the second hollow rotor 57 by a holder adjustment screw 80. The cam follower holders 77b, 77d which are circumstantially angularly spaced 90° from the cam follower holders 77a, 77c are prevented from radially moving by respective screws 83b, 83c, and are normally urged away from the cam follower holders 77a, 77c by a spring holder plate 81 and a spring 82 which are attached to the proximal end surface of the second hollow rotor 57 by means of screws 84. The cam followers 76a through 76d are loosely inserted in the cam groove 51c in the hollow quill 51. The cam followers 76a, 76c are pressed against one wall surface of the cam groove 51c by the holder adjustment plate 79 and the holder adjustment screw 80, and the cam followers 76b, 76d are pressed against the opposite wall surface of the cam groove 51c by the spring holder plate 81 and the spring 82. With this arrangement, any play between the cam followers 76a through 76d and the wall surfaces of the cam groove 51c is eliminated to remove the axial backlash of the hollow quill 51 without applying a moment to the hollow quill 51.

The tool driving unit of the third embodiment operates as follows:

In FIG. 5, the first motor 55 is energized to rotate the first hollow rotor 54 in one direction or the other, thereby rotating the spindle 52 in the same direction through the ball splines 53. At this time, the rotational speed of the first hollow rotor 54 is detected by the encoder 56. Based on the detected rotational speed, the second motor 58 is energized in or out of synchronism with the first hollow rotor 54 to rotate the second hollow rotor 57 in the same direction or the opposite direction. The rotative force of the second hollow rotor 57 is transmitted to the hollow quill 51 through the cam followers 76 on the second hollow rotor 57 and the helical cam groove 51c in the hollow quill 51 in which the cam followers 76 are fitted. Since the hollow quill 51 is prevented from rotating by the stop member 65, the rotative force transmitted to the hollow quill 51 is converted to an axial moving force to move the quill 51 toward its distal end with respect to the housing frame 1. Therefore, while the spindle 52 is rotated in one direction, it is axially moved toward its distal end to enable the tapping tool 71 to form screw threads in a workpiece (not shown).

While in the illustrated third embodiment the cam groove 51c serving as one component of a quill moving means is defined in the outer peripheral surface of the hollow quill 51 and the cam followers 76 serving as another component of the quill moving means are mounted on the second hollow rotor 57, the cam followers 76 may be mounted on the hollow quill 51 and the cam groove 51c may be defined in the inner peripheral surface of the second hollow rotor 57.

A tool driving unit according to a fourth embodiment will be described below with reference to FIGS. 10 through 13.

Those parts shown in FIGS. 10 through 13 which are structurally and functionally identical to those shown in FIGS. 2 through 4 are denoted by identical reference numerals, and will not be described in detail.

Figure 10:
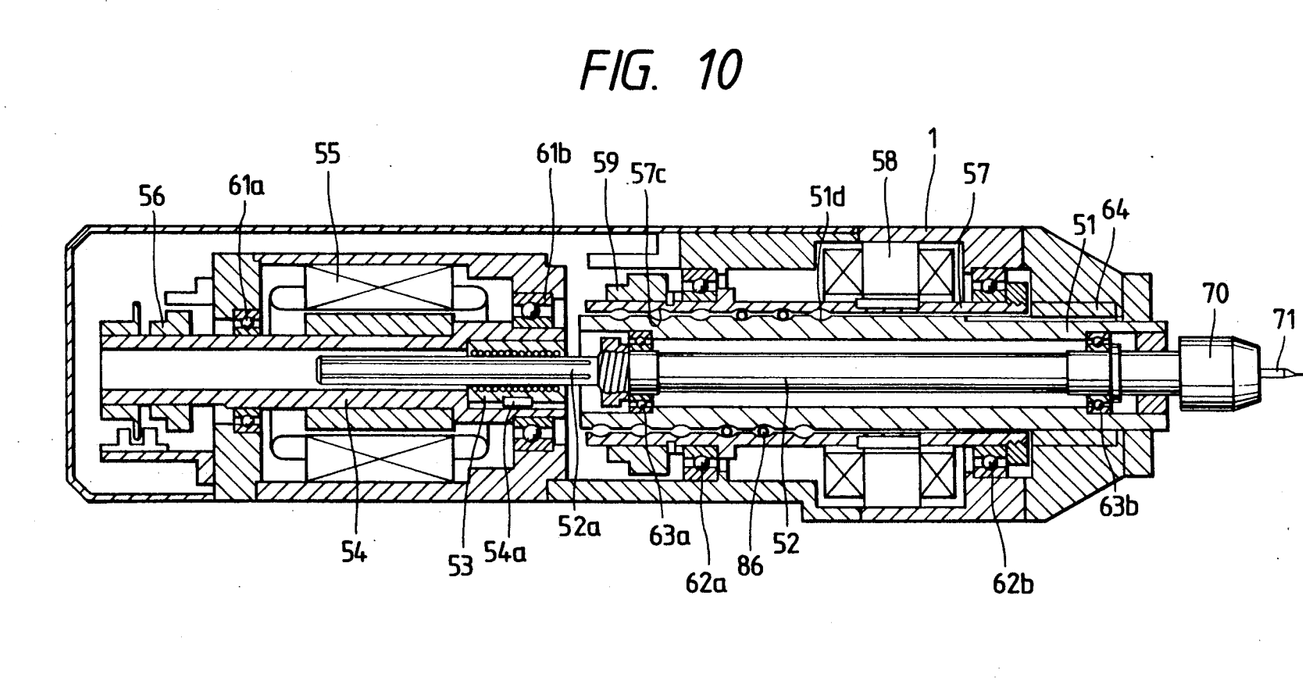
FIG. 10 is a cross-sectional view of a tool driving unit according to a fourth embodiment of the present invention.
Figure 11:
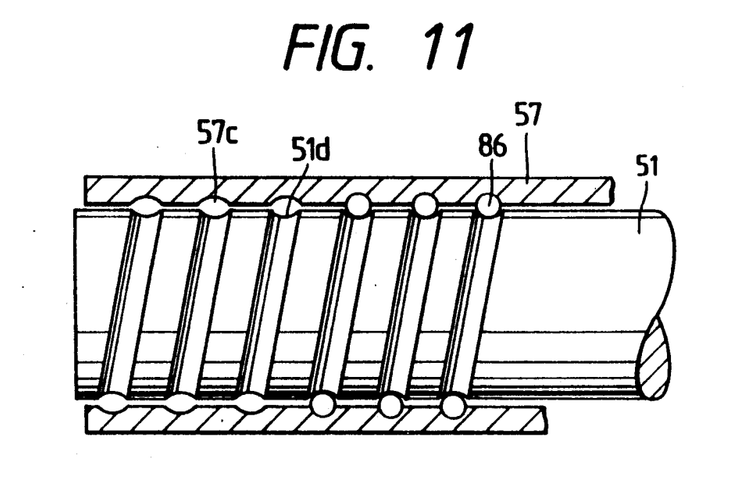

The hollow hollow quill 51 is externally threaded 51d, and the second hollow rotor 57 is internally threaded at 57c, as shown in FIGS. 10 and 11. Balls 86 are disposed between the grooves between the external threads 51d and the internal threads 57c in a circulating or non-circulating manner.

If the internal threads 57c of the second hollow rotor 57 were short, the balls 86 would move to and slip at the end of the internal threads 57c. Therefore, the length of the internal threads 57c is increased to allow the balls 86 to move between the grooves between the external threads 51d and the internal threads 57c without slippage. If the length of the internal threads 57c cannot be increased, a mechanism for allowing the balls 86 to circulate may be provided as with an ordinary ball screw mechanism to allow the balls 86 to move between the grooves between the external threads 51d and the internal threads 57c without slippage.

Figure 12:
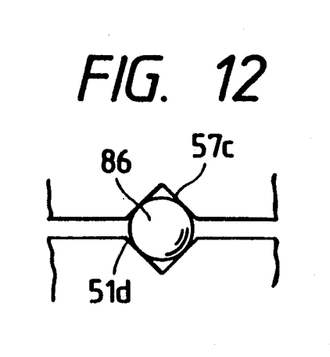
FIG. 12 is a fragmentary view showing a ball and its surrounding parts in the tool driving unit of FIG. 10.

As shown in FIG. 12, the outside diameter of the balls 86 is slightly larger than the space of the thread grooves so that the ball 86 contacts the surfaces of the thread groove at four points. Therefore, the second hollow rotor 57 and the hollow quill 51 are preloaded by the balls 86 to eliminate any axial play of the hollow quill 51, thus removing the backlash and increasing the rigidity of the hollow quill 51.

Operation of the tool driving unit of the fourth embodiment is as follows:

In FIG. 10, the first motor 55 is energized to rotate the first hollow rotor 54 in one direction or the other, thereby rotating the spindle 52 in the same direction through the ball splines 53. At this time, the rotational speed of the first hollow rotor 54 is detected by the encoder 56. Based on the detected rotational speed, the second motor 58 is energized in or out of synchronism with the first hollow rotor 54 to rotate the second hollow rotor 57 in the same direction. The rotative force of the second hollow rotor 57 is transmitted to the hollow quill 51 through the internal threads 57c of the second hollow rotor 57, the balls 86, and the external threads 51d of the hollow quill 51. Since the hollow quill 51 is prevented from rotating by the stop member 65, the rotative force transmitted to the hollow quill 51 is converted to an axial moving force to move the hollow quill 51 toward its distal end with respect to the housing frame 1. Therefore, while the spindle 52 is being rotated in one direction, it is axially moved toward its distal end. When the first motor 55 and the second motor 58 are controlled to rotate in synchronism with each other, the tapping tool 71 forms screw threads in a workpiece (not shown).

Figure 13:
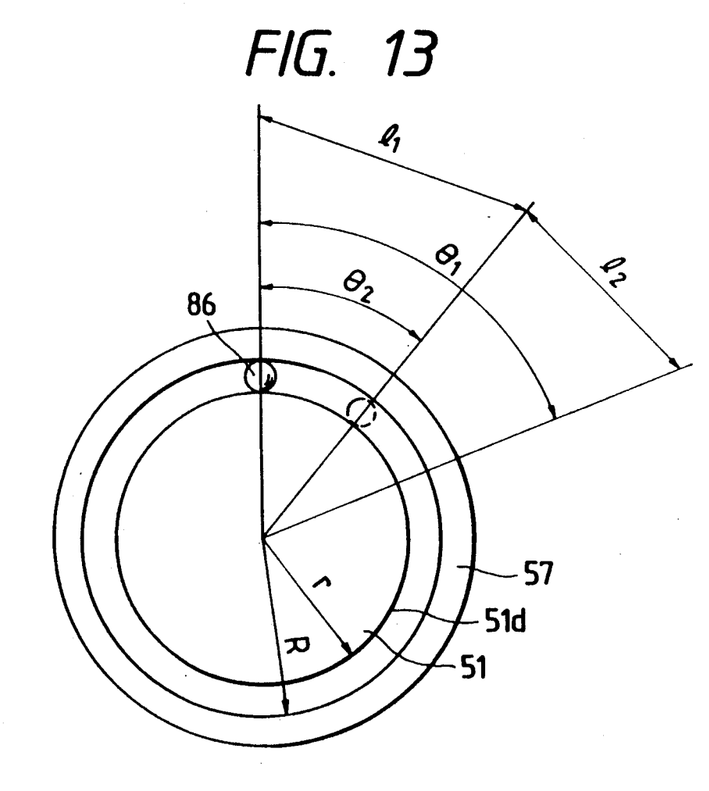
FIG. 13 is a schematic view showing the manner in which the ball moves.

FIG. 13 illustrates the manner in which the ball 86 moves when the second hollow rotor 57 rotates. It is now assumed that when the hollow rotor rotates through an angle $\theta_1$, the ball 16 rotates through an angle $\theta_2$. In order for the ball 86 to move on in the thread groove of the hollow quill 51 without slippage, at this time, the ball 86 moves a distance $l_1$ which is given by:

$$l_1 = \frac{\theta_2}{360} \times \sqrt{p^2 + (2\pi r)^2}$$

In order for the ball 86 to move in the thread groove of the second hollow rotor 57 without slippage, the relative distance $l_2$ which the ball 86 moves with respect to the ball 86 in the thread groove of the second hollow rotor 57 is given as follows:

$$l_2 = \frac{\theta_1 - \theta_2}{360} \times \sqrt{p^2 + (2\pi R)^2}$$

On the circumferential surface of the ball 86, since the distances $l_1$ and $l_2$ are equal to each other, the angles $\theta_1$ and $\theta_2$ are related to each other as follows:

$$\theta_2 = \frac{R'}{R' + r'} \cdot \theta_1$$

where $R' = \sqrt{p^2 + (2\pi R)^2}$ $r' = \sqrt{p^2 + (2\pi r)^2}$

Assuming that the maximum distance which the hollow quill 51 moves is Lmax, the maximum angle $\theta_1$max through which the hollow rotor 57 rotates is expressed by:

$$\theta_1\text{max} = \frac{L\text{max}}{P} \times 360°$$

Therefore, the maximum angle $\theta_2$max through which the ball 86 rotates is given by:

$$\theta_2\text{max} = \frac{R'}{R' + r'} \cdot \theta_1\text{max}$$

The maximum distance L'max which the ball 86 moves axially is expressed by:

$$L'\text{max} = P \cdot \theta_2\text{max}$$

By selecting the length of the internal threads 57c of the second hollow rotor 57 to be longer than the maximum distance L'max of axial movement of the ball 86, the ball 86 can move without slipping on the threads 51d, 57c.

With the fourth embodiment, by providing the second hollow rotor 57 of the second motor 58 with the internal threads 57c of appropriate length, a simple mechanical for converting rotary motion to straight motion is provided without any mechanism for circulating the balls 86.

According to the present invention, as described above in detail, a single shaft is employed for rotating a tool and axially moving the tool, and rotating and axially moving motors are disposed concentrically around the single shaft. Therefore, the size (particularly the outside diameter) of a tool driving unit is reduced, making it easy for the tool driving unit to tap or drill a workpiece. The installation space for the tool driving unit is reduced, the number of parts which the tool driving unit is made up of is reduced, and the positional accuracy of the components of the tool driving unit when it is assembled is increased. Since no gear is included in the power transmission assembly, any noise produced by the tool driving unit is small, and the tool driving unit is operated smoothly. The rotary motion and the axial back-and-forth motion can selectively be produced. Since the speed of rotation of the spindle of the tool driving unit and the speed of feeding movement thereof can be synchronized by electronic controls, the pitch of movement of the spindle can easily be varied.

Although certain preferred embodiments have been shown and described, it should be understood that many changes and modifications may be made therein without departing from the scope of the apended claims.

What is claimed is:

1. A tool driving unit for moving a tool in axial direction thereof and for rotating the tool about its axis, said tool driving unit comprising:
    a housing frame;
    a spindle supported in said housing frame and extending in said housing frame, said spindle having one end portion projecting out of said housing frame;
    a tool chuck mounted on said one end portion of said spindle for holding said tool;
    spindle supporting means for rotatably mounting said spindle therein, said spindle supporting means being slidable together with said spindle, in the axial direction and being prevented from being rotated;

a first motor comprising a first stator fixed to said housing frame and a first hollow rotor disposed around said spindle for rotating said spindle;

a second motor, provided apart from said first motor, comprising a second stator fixed to said housing frame and a second hollow rotor disposed around said spindle supporting means for moving said spindle supporting means together with said spindle in the axial direction, said second motor being energized irrespective of energization of said first motor, whereby said spindle supporting means and said spindle are moved in the axial direction irrespective of a rotation of said spindle; and control means for controlling said first and said second motors according to an input command given by the operators.

2. A tool driving unit according to claim 1, said spindle supporting means further comprising a hollow quill concentrically disposed over said spindle and axially slidably disposed in said housing frame, said spindle being rotatably provided wherein said hollow quill, and wherein means for moving said spindle supporting means and said spindle in axial direction comprises a screw mechanism comprising external threads formed on an outer peripheral surface of said hollow quill and internal threads engageable with said external threads and formed in an inner peripheral surface of said second hollow rotor comprising a part of said second motor.

3. A tool driving unit according to claim 1, said spindle supporting means further comprising a hollow quill concentrically disposed over said spindle and axially slidably disposed in said housing frame, said spindle being rotatably provided within said hollow quill, and wherein means for moving said spindle supporting means and said spindle in the axial direction comprises a ball screw assembly comprising external threads formed on an outer peripheral surface of said hollow quill, internal threads engageable with said external threads and formed on an inner peripheral surface of said second hollow rotor comprising a part of said second motor and balls interposed between said external and internal threads.

4. A tool driving unit according to claim 1, said spindle supporting means further comprises a hollow quill concentrically disposed over said spindle and axially slidably disposed in said housing frame, said spindle being rotatably provided within said hollow quill and said hollow quill being prevented from being rotated, and wherein means for moving said spindle supporting means and said spindle in the axial direction comprises a helical cam groove formed on one of the surface of said second hollow rotor comprising a part of said second motor and an outer peripheral surface of said hollow quill, and a cam follower disposed on the other of the surface of the second hollow rotor and the outer peripheral surface of said hollow quill and held in engagement with said helical cam groove.

5. A tool driving unit according to claim 4, wherein said cam mechanism further comprises a cam follower holder provided at one end portion of said second hollow rotor for mounting said cam follower therein such that said cam follower is engageable with said helical cam, a spring holder plate provided on the proximal end surface of said second hollow rotor, and a spring provided between said spring holder plate and said cam follower holder for urging said cam follower in a predetermined direction to press the cam follower against a wall of said helical cam, so that an axial backlash of said hollow quill is prevented.

6. A tool driving unit according to claim 1, further comprising means for transmitting a rotation to said first hollow rotor to said spindle, said transmitting means being provided between said first hollow rotor and said spindle.

7. A tool driving unit according to claim 6, wherein said transmitting means comprises splines integrally provided at said spindle, said first hollow rotor being formed with spline grooves engageable with said splines, for rotating said spindle about its axis together with the rotation of said first hollow rotor.

8. A tool driving unit according to claim 1, wherein said spindle supporting means comprises a hollow quill disposed axially slidably in said housing frame for mounting said spindle therein, and said second hollow rotor comprising a part of said second motor is rotatably mounted to an outer peripheral surface of said hollow quill and said quill is axially slidably moved in accordance with the rotation of said second hollow rotor.

9. A tool driving unit according to claim 1, further comprising detecting means for detecting rotational speeds of said first and second motors.

10. A tool driving unit according to claim 9, wherein the rotational speeds of said first and second motors are controlled in synchronism with each other in accordance with the detected rotational speeds.

11. A tool driving unit according to claim 1, further comprising a detecting means for detecting angular positions of said first and second motors.

12. A tool driving unit according to claim 11, wherein the angular positions of said first and second motors are controlled in synchronism with each other in accordance with the detected angular positions.

13. A tool driving unit according to claim 1, further comprising detecting means for detecting rotational speeds and angular positions of said first and second motors.

14. A tool driving unit according to claim 13, wherein the rotational speeds and angular positions of said first and second motors are controlled in synchronism with the detected rotational speeds and angular positions.

15. A tool driving unit according to claim 14, wherein said detecting means comprises encoders each for detecting both of the rotational speed and angular position of each of said first and second motors.

16. A tool driving unit according to claim 1, wherein said tool comprises a tapping tool.

17. A tool driving unit according to claim 16, wherein the moving operation of said tapping tool provided to said spindle in the axial and rotational directions is carried out at an arbitrary pitch according to the input command given by the operators.

18. A tool driving unit as claimed in claim 1, wherein said first motor is mounted in said housing frame at an end away from said one end portion of said spindle and said second motor is mounted in said housing frame at an end closest where said one end portion of said spindle projects from said housing frame.

19. A tool driving unit for moving a tapping tool in axial and rotational direction thereof, comprising:

a housing frame;

a spindle having said tapping tool at one end portion thereof, said spindle being supported in said housing frame;

a first motor provided in said housing frame for rotating said spindle, said first motor comprising a first hollow rotor disposed around said spindle and a first stator fixed to said housing frame;

a second motor provided apart from said first motor in said housing frame for moving said spindle in the axial direction, said second motor comprising a second hollow rotor disposed around said spindle and a second stator fixed to said housing frame;

a first detection means for detecting a rotational speed and an angular position of said spindle in association with the rotation of said first motor;

a second detection means for detecting a moving speed and a moving position of said spindle in association with the rotation of said second motor; and a control means for controlling rotations of said first and second motors in accordance with the detected moving speed and position of said spindle.

20. A tool driving unit for moving a tapping tool in axial and rotational direction thereof, comprising:

a housing frame;

a spindle supported in said housing frame and extending in said housing frame, said spindle being supported in said housing frame and having said tapping tool at one end portion projecting out of said housing frame and plural axial splines formed on the outer periphery of the other end portion;

a tool chuck mounted on the one end portion of said spindle for holding said tapping tool;

a first motor provided in said housing frame for rotating said spindle, said first motor comprising a first hollow rotor disposed around said spindle and a first stator fixed to said housing frame;

roller bearings provided between said splines and said first hollow rotor for transmitting a rotation of said first hollow rotor to said spindle to rotate said spindle;

a second motor provided apart from said first motor in said housing frame for moving said spindle in the axial direction, said second motor comprising a second hollow rotor disposed around said spindle and a second stator fixed to said housing frame;

a first detection means provided beside said first hollow rotor for detecting a rotational speed and an angular position of said first motor;

a second detection means provided beside said second hollow rotor for detecting a rotational speed and an angular position of said second motor;

a motor control means for controlling rotations of said first and second motors in accordance with the detected rotational speeds and angular positions;

a hollow quill concentrically disposed over said spindle and axially slidably disposed in said housing frame, said spindle being rotatably provided within said hollow quill and having a cam groove formed on the outer peripheral surface of said hollow quill;

a cam follower provided at the inner peripheral surface of said second hollow rotor in such a manner as to be slidably engageable with said cam groove of said hollow quill, said hollow quill being moved in the axial direction thereof in accordance with the rotation of said cam hollower; and a control unit for controlling said first and second motors according to the input command given by the operators.

* * * * *